United States Patent [19]
Blonder

[11] Patent Number: 5,539,821
[45] Date of Patent: Jul. 23, 1996

[54] POWER OUTLET MOUNT FOR A PORTABLE TELEPHONE

[75] Inventor: Greg E. Blonder, Summit, N.J.

[73] Assignee: AT&T Corp., Murray Hill, N.J.

[21] Appl. No.: 378,040

[22] Filed: Jan. 24, 1995

[51] Int. Cl.⁶ ........................................ H04M 1/00
[52] U.S. Cl. ..................... 379/446; 379/455; 379/454
[58] Field of Search ............................ 379/446, 426,
379/454, 455, 66; 455/89, 90; 439/655,
638, 639, 651, 652, 956; 363/146; 320/2

[56] References Cited

U.S. PATENT DOCUMENTS

| | | | |
|---|---|---|---|
| 4,058,678 | 11/1977 | Dunn et al. | 379/66 |
| 4,349,706 | 9/1982 | Thomspon | 179/100 |
| 4,558,270 | 12/1985 | Liantaud et al. | 455/90 |
| 4,875,232 | 10/1989 | Shumway | 379/413 |
| 5,075,615 | 12/1991 | Dantis | 320/2 |

Primary Examiner—Jeffery A. Hofsass
Assistant Examiner—Jack Chiang
Attorney, Agent, or Firm—David Volejnicek

[57] ABSTRACT

An apparatus (10) mounts a telephone, particularly the handset (15) of a portable telephone, to a wall A.C. power outlet (11) and supplies power from the power outlet to the telephone. The apparatus comprises a chassis (12), at least one A.C. power plug (30,31) carried by the chassis for electrically connecting to, and mounting the chassis on, the A.C. power outlet, at least one A.C. power socket (40, 41) connected to the A.C. power plug and carried on the chassis so as not to deprive a user of the use of the power outlet, a cradle (14) carried by the chassis for the telephone handset (15) of a portable phone, and a power converter (18) carried by the chassis for obtaining A.C. power from the A.C. power outlet through the A.C. power plug, converting the obtained power into D.C. power, and supplying the D.C. power to the telephone handset through the cradle.

8 Claims, 2 Drawing Sheets

POWER OUTLET MOUNT FOR A PORTABLE TELEPHONE

TECHNICAL FIELD

The invention relates to a wall-mounting adaptor for a telephone, particularly for a portable telephone handset.

BACKGROUND OF THE INVENTION

Many new phones—especially portable phones such as cordless and cellular phones—draw enough power to require for their operation a power source other than the telephone line. Although this power is provided by a built-in battery in the case of portable phone handsets, these handsets nevertheless require an external power source for recharging the battery. Moreover, their base units require an external power source for operation.

The most popular location for a phone in residences has traditionally been the kitchen wall. In fact, most builders automatically install a wall-mount phone jack in the kitchen of new homes and apartments. Unfortunately, a power outlet is often not located close to the phone jack. And even if there is a power outlet in the vicinity of the phone jack, the power cord leading thereto from the phone is likely to be aesthetically displeasing, and perhaps even a safety hazard.

SUMMARY OF THE INVENTION

This invention is directed to solving these and other problems and disadvantages of the prior art. According to the invention, there is provided an apparatus that mounts a telephone, particularly the handset of a portable telephone, to an A.C. power outlet and supplies power from the power outlet to the telephone. The apparatus comprises a chassis, at least one A.C. power plug carried by the chassis for electrically connecting to the A.C. power outlet and mounting the chassis on the A.C. power outlet, at least one A.C. power socket connected to the A.C. power plug and carried by the chassis so as not to deprive a user of the use of the power outlet, a power converter carried by the chassis for obtaining A.C. power from the A.C. power outlet through the at least one A.C. power plug, converting the obtained A.C. power into telephone power (such as D.C. power), and supplying the telephone power to a telephone arrangement, and a cradle carried by the chassis for a telephone handset of the telephone arrangement.

The telephone arrangement may also include a telephone base carried by the chassis and providing a communications connection to a telephone line through the A.C. power outlet, in a known manner. Alternatively, if the telephone is a portable telephone, the telephone base may be located elsewhere at a telephone jack, and the power converter recharges the telephone handset.

The arrangement thus provides both power for the telephone and a convenient mount for the telephone handset at a power outlet, substantially without regard for the location of a telephone outlet and without requiring a power cord to connect to the power outlet. Yet, it does not deprive a user of the use of the power outlet for other purposes. And because it is wall-mounted, it also does not deprive the user of counter-top space.

These and other advantages and features of the invention will become apparent from the following description of an illustrative embodiment of the invention considered together with the drawing.

DETAILED DESCRIPTION

Figure 1:
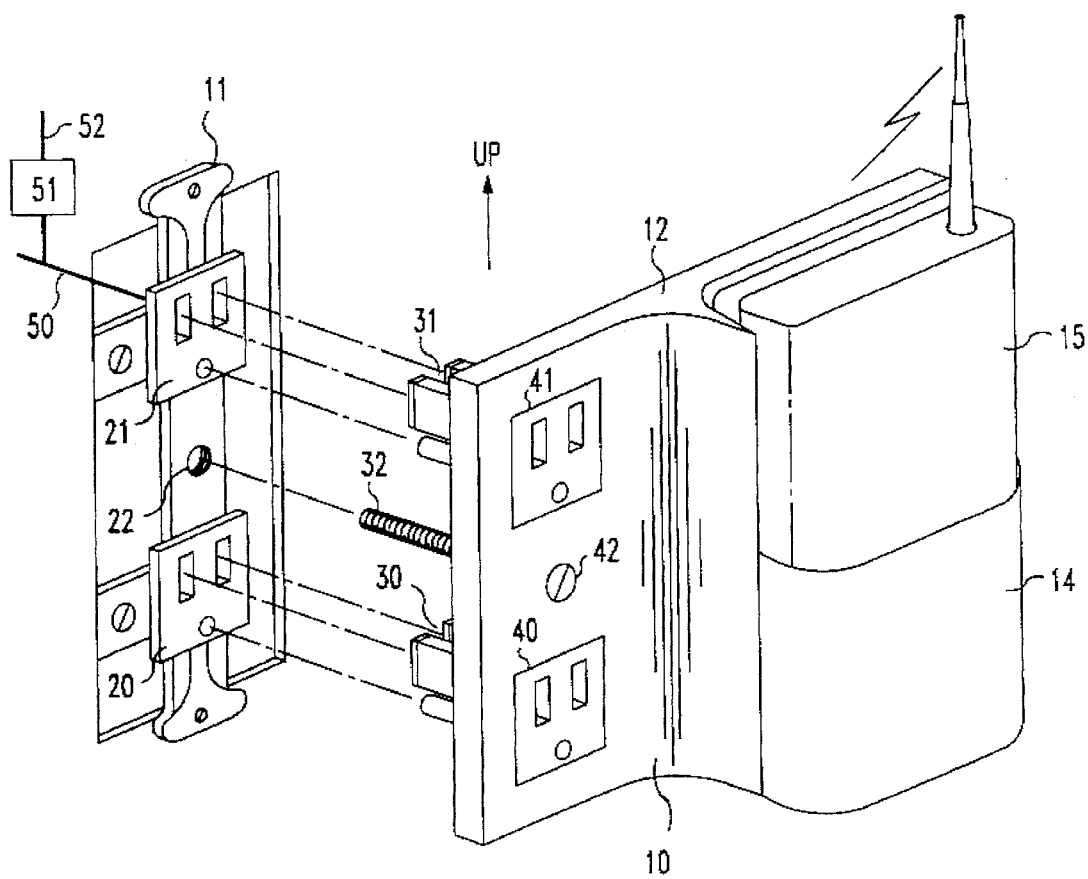
FIG. 1 is a perspective view of a power-outlet telephone mount that includes an illustrative embodiment of the invention.

FIG. 1 shows a perspective view of a power-outlet telephone mount 10 constructed according to the invention, in relation to a wall-mounted power outlet 11 to which telephone mount 10 attaches. Power outlet 11 is conventional, comprising a pair of three-prong A.C. power sockets 20, 21 positioned one above the other and having a screw hole 22 inbetween for attaching a cover plate thereto.

Telephone mount 10 includes an elongated hollow chassis 12 which holds all requisite wiring and circuitry. Positioned to one side of chassis 12 on the back thereof is a pair of three-prong A.C. power plugs 30, 31 designed to fit into sockets 20, 21 and thereby mount telephone mount 10 onto power outlet 11. A screw 32 extends though a screw hole 42 through chassis 12 into screw hole 22 of power outlet 11 and holds telephone mount 12 firmly in place on power outlet 11. Plugs 30 and 31 are electrically connected to a pair of three-prong A.C. power sockets 40 and 41 that are positioned on the front of chassis 12. Sockets 40 and 41 serve as substitutes for sockets 20 and 21 when telephone mount 10 is mounted on power outlet 11, so as not to deprive the user of any A.C. power connections.

Figure 2:
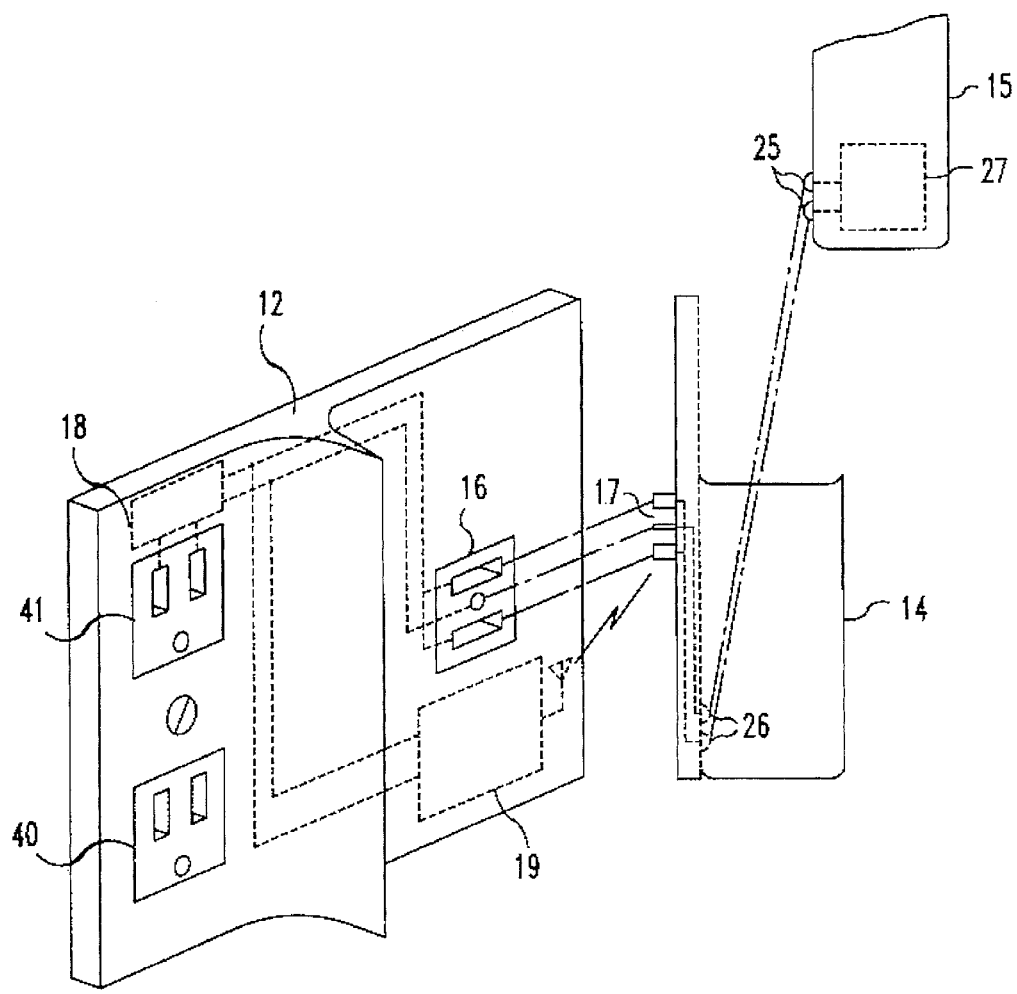
FIG. 2 is an exploded view of the power-outlet telephone mount of FIG. 1.

Positioned to the other side of chassis 12 on the front thereof is a cradle 14 for a portable telephone handset 15. Cradle 14 is removably mounted on chassis 12. As shown in FIG. 2, portable telephone handset 15 has a pair of D.C. electrical contacts 25 through which it makes electrical contact with a corresponding pair of D.C. electrical contacts 26 inside of cradle 14. Through these electrical contacts 25, 26, an internal battery 27 of telehone handset 15 is recharged when telephone handset 15 is placed inside of cradle 14. Because different telephone handsets 15 often have different configurations of contacts 25, a plurality of different cradles 14 may be made available with chassis 12, each cradle 14 having a different configuration of contacts 26 for a different telephone handset 15.

Chassis 12 is equipped with a D.C. electrical socket 16 which is adapted to mate with a D.C. electrical plug 17 carried by cradle 14. Socket 16 and plug 17 both provide an electrical connection between cradle 14 and chassis 12 and physically mount cradle 14 onto chassis 12. D.C. electrical socket 16 is connected through an A.C.-to-D.C. converter 18 mounted inside chassis 12 to one of A.C. power plugs 30 or 31 to supply cradle 14 with electrical power drawn from power outlet 11. D.C. electrical plug 17 is in turn electrically connected to D.C. contacts 26 of cradle 14.

While power outlet 11 is normally mounted on a wall in the orientation shown in FIG. 1, it may alternatively be mounted up-side-down, thereby requiring chassis 12 to likewise be mounted up-side-down relative to its orientation shown in FIG. 1. Cradle 14 is removably mounted on chassis 12, as opposed to being integral therewith, so that it may always be positioned right-side-up irrespective of the position of chassis 12. For this purpose, socket 16 and plug 17 are vertically symmetrical and socket 16 is vertically centered on chassis 12. As a consequence, cradle 14 can be mounted right-side-up on chassis 12 irrespective of whether chassis 12 is mounted right-side-up or up-side-down on power outlet 11.

Alternatively, plug 17 and socket 16 may be asymmetrical but either plug 17 or socket 16 may be rotatable by 180° so as to permit cradle 14 to always be mounted right-side-up on chassis 12. Or, either plug 17 or socket 16 may be replaced by a short flexible cable.

Because telephone mount 10 provides power to telephone handset 15, telephone handset 15 need not be re-placed on a telephone base after each use. Hence, the telephone base may be located elsewhere at a telephone jack. Alternatively, as shown in FIG. 2, the telephone base maybe incorporated as a circuit 19 into telephone mount 10. In this configuration, circuit 19 is connected via wiring in telephone mount 10 to one of the A.C. power sockets 40, 41 and transceives telephone signals through the A.C. power outlet 11 and associated A.C. wiring 50 by using F.M. modulation, in a well-known manner. At some other location, a second F.M. transceiver 51 then interconnects the A.C. wiring with a telephone link 52 so as to provide the requisite connection with the telephone system.

Of course, various changes and modifications to the illustrative embodiment described above will be apparent to those skilled in the art. For example, telephone handset 15 need not be portable, but may be corded and attached by a telephone cord to telephone circuit 19 of telephone mount 10 or may be a speakerphone. Additionally, telephone mount 10 may include a cord retractor for the telephone cord. Furthermore, telephone mount 10 may include fewer than or more than two A.C. power sockets 40, 41, and it may include a ground-fault interrupter for protecting either of both A.C. power sockets 40, 41 and D.C. power contacts 16. Also, to enable its use with two-prong power outlets 11, telephone mount 10 may have the third (ground) prongs of its A.C. power lugs 30,31 removable, and provide ground contact with the power outlet via mounting screw 32. Furthermore, telephone mount 10 may include a power-line filter to eliminate electrical noise generated by other appliances from coupling into, and interfering with the operation of, the telephone circuit and/or handset. Such changes and modifications can be made without departing from the spirit and the scope of the invention and without diminishing its attendant advantages. It is therefore intended that such changes and modifications be covered by the following claims.

I claim:

1. An apparatus comprising:

a chassis;

at least one A.C. power plug carried by the chassis, for electrically connecting to at least one A.C. socket of an A.C. power outlet and mounting the chassis on the A.C. power outlet;

at least one A.C. power socket carried by the chassis and connected to the at least one A.C. power plug, the at least one A.C. power socket carried by the chassis serving as a direct substitute for the at least one A.C. socket of the A.C. power outlet while the chassis is mounted on the A.C. power outlet to provide an A.C. power connection to the A.C. power outlet while the chassis is mounted on the A.C. power outlet that duplicates an A.C. power connection to the A.C. power outlet provided by the at least one A.C. socket of the A.C. power outlet while the chassis is not mounted on the A.C. power outlet;

a cradle carried by the chassis for a telephone handset of a telephone means; and a power converter carried by the chassis for obtaining A.C. power from the A.C. power outlet through the at least one A.C. power plug without preempting the A.C. power connection to the A.C. power outlet provided by the at least one A.C. power socket carried by the chassis, converting the obtained A.C. power into telephone power, and supplying the telephone power to the telephone means.

2. The apparatus of claim 1 wherein:

the telephone power comprises D.C. power.

3. The apparatus of claim 1 wherein:

the cradle is removably mounted on the chassis and mounts on the chassis in a first position, and in a second position rotated 180° with respect to the first position.

4. The apparatus of claim 1 further comprising:

one of a telephone power plug and a telephone power socket carried by the chassis; and the other of the telephone power plug and the telephone power socket carried by the cradle, for making electrical contact with and mounting the cradle on the one of the telephone power plug and the telephone power socket carried by the chassis.

5. The apparatus of claim 4 wherein:

the telephone power plug and the telephone power socket mate with each other in a first position, and in a second position wherein the telephone power plug and the telephone power socket are rotated with respect to each other by 180° relative to the first position.

6. The apparatus of claim 1 wherein:

the telephone handset is a portable telephone handset; and the cradle includes electric contact means for making electric contact with the portable telephone handset to supply the telephone power to the portable telephone handset.

7. The apparatus of claim 1 further comprising:

the telephone means, including the telephone handset, and telephone base circuitry carried by the chassis, for communicating with the handset.

8. The apparatus of claim 7 wherein:

the telephone means further include means connected to the at least one power plug for providing a communications connection between the telephone base circuitry and a telephone line through the power outlet.

\* \* \* \* \*